(12) United States Patent
Faiella et al.

(10) Patent No.: US 10,301,425 B2
(45) Date of Patent: May 28, 2019

(54) PROCESS FOR THE PRODUCTION OF ALIPHATIC-AROMATIC POLYESTERS

(71) Applicant: Novamont S.p.A., Novara (IT)

(72) Inventors: Federico Faiella, Castelletto Sopra Ticino (IT); Tiziana Milizia, Novara (IT); Roberto Vallero, Borgo d'Ale (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 15/516,503

(22) PCT Filed: Oct. 2, 2015

(86) PCT No.: PCT/EP2015/072818
§ 371 (c)(1),
(2) Date: Apr. 3, 2017

(87) PCT Pub. No.: WO2016/050963
PCT Pub. Date: Apr. 7, 2016

(65) Prior Publication Data
US 2018/0237584 A1    Aug. 23, 2018

(30) Foreign Application Priority Data
Oct. 3, 2014    (IT) .............................. MI2014A1733

(51) Int. Cl.
*C08G 63/02*  (2006.01)
*C08G 63/183*  (2006.01)
*C08G 63/16*  (2006.01)
*C08G 63/181*  (2006.01)
*C08G 63/85*  (2006.01)
*C08G 63/46*  (2006.01)

(52) U.S. Cl.
CPC .......... *C08G 63/183* (2013.01); *C08G 63/16* (2013.01); *C08G 63/181* (2013.01); *C08G 63/46* (2013.01); *C08G 63/85* (2013.01)

(58) Field of Classification Search
USPC ......................... 528/271, 272, 273, 274, 279
See application file for complete search history.

(56) References Cited

U.S. PATENT DOCUMENTS
2013/0158196 A1    6/2013  Teasley

FOREIGN PATENT DOCUMENTS
WO    WO-00/46271 A1    8/2000

*Primary Examiner* — Terressa Boykin
(74) *Attorney, Agent, or Firm* — Polsinelli PC

(57) ABSTRACT

This invention relates to a process for the production of polyesters comprising an esterification/transesterification stage and a polycondensation stage, characterized in that the said polycondensation stage is carried out in the presence of a catalyst comprising a mixture of at least one Titanium-based compound and at least one Zirconium-based compound in which the Ti/(Ti+Zr) ratio by weights is equal to or greater than 0.01 and equal to or less than 0.70.

21 Claims, No Drawings

PROCESS FOR THE PRODUCTION OF ALIPHATIC-AROMATIC POLYESTERS

CROSS REFERENCE TO RELATED APPLICATIONS

This application is a National Phase filing under 35 U.S.C. § 371 of PCT/EP2015/072818 filed on Oct. 2, 2015; and this application claims priority to Application No. MI2014A001733 filed on Oct. 3, 2014 in Italy. The entire contents of each application are hereby incorporated by reference.

This invention relates to a process for the production of polyesters comprising an esterification or transesterification stage and a polycondensation stage, characterised in that the said polycondensation stage is carried out in the presence of a catalyst comprising a mixture of at least one compound based on Titanium and at least one compound based on Zirconium in which the Ti/(Ti+Zr) ratio by weight is equal to or greater than 0.01 and equal to or less than 0.70, preferably equal to or greater than 0.02 and equal to or less than 0.60.

This process makes it possible to obtain aliphatic-aromatic polyesters having suitable thermal stability and terminal acidity properties with a reduced content of residual cyclic oligomers, which are undesired by-products of the polymerisation process. Because of this these polyesters are particularly suitable for use in the production of films, expanded articles and moulded articles and in general in all sectors of the plastics industry.

Processes for the production of polyesters have hitherto been widely known in the literature and exploited industrially. On an industrial scale these processes generally comprise at least two reaction stages: a first esterification or transesterification stage in which, starting from diols of dicarboxylic acids, their salts or their esters, an intermediate oligomer product is formed, and this is subsequently caused to react in a polycondensation stage in such a way as to obtain the final polyester.

In comparison with the production of wholly aromatic polyesters, such as PET and PBT, the production of aliphatic-aromatic polyesters presents special problems associated with the different nature of the monomers used and the reaction conditions required in order to obtain polymers having sufficiently high molecular weights.

In particular processes for the production of aliphatic-aromatic polyesters have disadvantages associated with the formation of significant quantities of residual cyclic oligomers, which by adversely influencing the properties of the polyesters and the productivity of the processes make it necessary to use suitable equipment for their separation and recovery of the polyester. In addition to this, in order to achieve high molecular weights these processes require relatively long reaction times and high reaction temperatures, which give rise to polyester degradation phenomena. Under these conditions the terminal acidity of the polyesters tends to increase, compromising their thermal stability properties in subsequent processing stages. Materials having poor thermal stability properties can in fact give rise to materials which tend to lose mechanical properties over time, when for example used for the production of blown films. As a consequence of this it is customary to subject polyesters of this type to chain extension or hydrolysis stabilisation treatments which attempt to limit these degradation phenomena, typically through attaching suitable derivatives at the terminal acids of the polyesters. This however gives rise to the provision of additional stages of polyester post-treatment, and thus has an adverse effect on the productivity of the processes.

There is therefore a need to identify production processes for aliphatic-aromatic polyesters which overcome the abovementioned problems of residual cyclic oligomer formation and which help to limit the thermal instability and excessive terminal acidity problems.

Starting from this requirement it has surprisingly been discovered that these problems can be significantly limited through suitable selection of the catalyst used during the polycondensation stage. It has in fact been discovered that a catalyst comprising a mixture of at least one Titanium-based compound and at least one Zirconium-based compound in which the Ti/(Ti+Zr) ratio by weight is equal to or greater than 0.01 and equal to or less than 0.70, preferably equal to or greater than 0.02 and equal to or less than 0.60, makes it possible to obtain aliphatic-aromatic polyesters having sufficiently high molecular weights, suitable thermal stability properties and terminal acidity, while at the same time giving rise to the formation of significantly smaller quantities of residual cyclic oligomers.

In particular this invention relates to a process for the production of polyesters comprising:
a) a dicarboxylic component comprising:
   a1) 40-80% mol, with respect to the total dicarboxylic component, of units deriving from at least one aromatic dicarboxylic acid,
   a2) 20-60% mol, with respect to the total dicarboxylic component, of units deriving from at least one aliphatic dicarboxylic acid,
b) a diol component comprising units deriving from at least one aliphatic diol;
the said process comprising an esterification or transesterification stage and a subsequent polycondensation stage and being characterised in that the said polycondensation stage is performed in the presence of a catalyst comprising a mixture of at least one Titanium-based compound and at least one Zirconium-based compound in which the Ti/(Ti+Zr) ratio by weight is equal to or greater than 0.01 and equal to or less than 0.70 preferably equal to or greater than 0.02 and equal to or less than 0.60.

With regard to the aliphatic-aromatic polyesters produced by the process according to this invention, these comprise a diol component deriving from at least one aliphatic diol selected from 1,2-ethanediol, 1,2-propanediol, 1,3-propanediol, 1,4-butanediol, 1,5-pentanediol, 1,6-hexanediol, 1,7-hheptanediol, 1,8-octanediol, 1,9-noenandiol, 1,10-decanediol, 1,11-undecanediol, 1,12-dodecanediol, 1,13-tridecanediol, 1,4-ciclohexanedimethanol, neopentyl glycol, 2-methyl-1,3-propanediol, dianhydrosorbitol, dianhydromannitol, dianhydroiditol, cyclohexanediol, cyclohexanemethanediol, pentaerythritol, glycerol, polyglycerol, trimethylolpropane, dialkylene glycols and polyalkylene glycols having a molecular weight of 100-4000, such as for example polyethylene glycol, polypropylene glycol and their mixtures. Preferably the diol component comprises at least 50% moles of one or more diols selected from 1,2-ethanediol, 1,3-propanediol, 1,4-butanediol. More preferably, the diol component comprises or consists of 1,2-ethanediol, 1,4-butanediol or mixtures thereof.

The dicarboxylic component of the polyesters produced by the process according to this invention comprises 40-80% mol, preferably more than 40% mol, more preferably 45-60% mol, with respect to the total dicarboxylic component, of units deriving from at least one aromatic dicarboxylic acid and 20-60% mol, preferably less than 60% mol, more preferably 40-55% mol, with respect to the total dicarboxylic component, of units deriving from at least one aliphatic dicarboxylic acid.

The aromatic dicarboxylic acids are advantageously selected from terephthalic acid, isophthalic acid, 2,5-furandicarboxylic acid, their esters, salts and mixtures. In a preferred embodiment, the said aromatic dicarboxylic acids comprise:

from 1 to 99% mol, preferably from 5 to 95% and more preferably from 10 to 80% of terephthalic acid, its esters or its salts;

from 99 to 1% mol, preferably from 95 to 5% and more preferably from 90 to 20% of 2,5-furandicarboxylic acid, its esters or its salts.

The aliphatic dicarboxylic acids are advantageously selected from saturated $C_2$-$C_{24}$ dicarboxylic acids, preferably $C_4$-$C_{13}$, more preferably $C_4$-$C_{11}$, their $C_1$-$C_{24}$, preferably C1-C4, alkyl esters, their salts and their mixtures. Preferably the aliphatic dicarboxylic acids are selected from: succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid and their $C_{1-24}$ alkyl esters. In a preferred embodiment of this invention the aliphatic dicarboxylic acids comprise mixtures comprising at least 50% mol, preferably more than 60% mol, more preferably more than 65% mol, of succinic acid, adipic acid, azelaic acid, sebacic acid, brassylic acid, their $C_1$-$C_{24}$, preferably $C_1$-$C_4$ esters and their mixtures.

In a preferred embodiment of the process according to this invention the polyester produced is advantageously selected from:

(A) polyesters comprising repetitive units deriving from aromatic dicarboxylic acids of the phthalic acid type, preferably terephthalic acid, aromatic dicarboxylic acids and aliphatic diols (AAPE-A), characterised by an aromatic units content of between 40-65.% mol, preferably between 45-60% mol with respect to the total moles of the dicarboxylic component.

AAPE-A polyesters are preferably selected from: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

(B) polyesters comprising repetitive units deriving from aromatic heterocyclic dicarboxylic compounds, preferably 2,5-furandicarboxylic acid, aromatic dicarboxylic acids and aliphatic diols (AAPE-B), characterised by an aromatic units content of between 40-80% mol, preferably between 45-75% mol with respect to the total moles of the dicarboxylic component.

AAPE-B polyesters are preferably selected from: poly(1,4-butylene adipate -co-1,4-butylene-2,5 -furandicarboxylate), poly(1,4-butylene sebacate-co-1,4-butylene-2,5-furandicarboxylate), poly(1,4-butylene azelate-co-1,4-butylene-2,5-furandicarboxylate), poly(1,4-butylene brassylate-co-1,4-butylene-2,5 -furandicarboxylate), poly(1,4-butylene succinate-co-1,4-butylene-2,5-furandicarboxylate), poly(1,4-butylene adipate-co-1,4-butylene sebacate-co-1,4-butylene-2,5-furandicarboxylate), poly(1,4-butylene azelate -co-1,4-butylene sebacate-co-1,4-butylene-2,5-furandicarboxylate), poly(1,4-butylene adipate-co-1,4-butylene azelate-co-1,4-butylene-2,5-furandicarboxylate), poly(1,4-butylene succinate-co-1,4-butylene sebacate-co-1,4-butylene-2,5-furandicarboxylate), poly(1,4-butylene adipate-co-1,4-butylene succinate-co-1,4-butylene-2,5-furandicarboxylate), poly(1,4-butylene azelate-co-1,4-butylene succinate-co-1,4-butylene-2,5-furan-dicarboxylate).

In addition to the dicarboxylic component and the diol component, the polyesters produced by the process according to this invention preferably comprise repetitive units deriving from at least one hydroxyacid in quantities of between 0-49% preferably between 0-30% mol with respect to the total moles of the dicarboxylic component. Examples of suitable hydroxyacids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxyacids may be inserted into the chain as such or may also be preventively caused to react with diacids or diols. In the process according to this invention, the hydroxyacids are advantageously added during the esterification stage.

Long molecules having two functional groups, including those with functional groups which are not in the terminal position, may also be present in quantities not exceeding 10% mol with respect to the total moles of the dicarboxylic component. Examples are dimer acids, ricinoleic acids and acids incorporating epoxy and even polyoxyethylene functional groups having a molecular weight of between 200 and 10000. In the process according to this invention these long molecules with two functional groups are advantageously added during the esterification stage.

Diamines, amino acids and aminoalcohols may also be present in percentages up to 30% mol with respect to the total moles of the dicarboxylic component. In the process according to this invention these diamines, amino acids and aminoalcohols are advantageously added during the esterification stage.

During the esterification stage of the process for the preparation of polyesters according to this invention, one or more multiple functional group molecules may be added in quantities of between 0.1 and 3% mol with respect to the total moles of the dicarboxylic component (and any hydroxyacids) in order to obtain branched products. Examples of these molecules are glycerol, pentaerythritol, trimethylolpropane, citric acid, dip entaerythritol, monoanhydrosorbitol, monoanhydromannitol, acid triglycerides or polyglycerols.

The molecular weight Mn of the polyesters obtained by the process according to this invention is preferably greater than 20000, more preferably >30000, even more preferably >50000. As far as the polydispersity index for the molecular weights Mw/Mn is concerned, this is instead preferably between 1.5 and 10, more preferably between 1.6 and 5 and even more preferably between 1.8 and 2.5

The molecular weights $M_n$ and $M_w$ may be measured by Gel Permeation Chromatography (GPC). The determination may be performed with the chromatography system held at 40° C., using a set of three columns in series (particle diameter 5 µ and porosities of 500 A, 1000 A and 10000 A respectively), a refractive index detector and chloroform as eluent (flow 1 ml/min), using polystyrene as the reference standard.

The polyesters obtained by the process according to this invention have a smaller quantity of residual cyclic oligomers and lower terminal acidity values than similar polyesters obtained using the processes for production in the prior art, thanks to use of the catalyst comprising a mixture of at least one Titanium-based compound and at least one Zirconium-based compound, in which the Ti/(Ti+Zr) ratio by weight is equal to or greater than 0.01 and equal to or less than 0.70, preferably equal to or greater than 0.02 and equal to or less than 0.60 in the polycondensation stage.

With regard to measurement of the cyclic oligomers content, this is performed gravimetrically after isolation from the polycondensation distillates. The cyclic oligomers are isolated by extracting a uniform aliquot of the exactly weighed polycondensation distillates with 5 volumes of water and 5 volumes of diethyl ether. The organic phase is separated off, dewatered with sodium sulphate and then dried by evaporation at low pressure, using for example a rotating evaporator to separate out the pure oligomer. If emulsions form at the interface or the separation is not sharp, the ionic strength of the aqueous phase can be increased by adding salts such as KCl, KI or NaCl to encourage breaking of the emulsion. The oligomer separated out is weighed and the quantity of oligomers is expressed as a ratio by weight with respect to the quantity of polyester which could theoretically be obtained by converting all the dicarboxylic acid fed to the process.

The terminal acid groups content may be measured in the following way: 1.5-3 g of polyester are placed in a 100 ml flask together with 60 ml of chloroform. After the polyester has completely dissolved 25 ml of 2-propanol are added and, immediately before the analysis, 1 ml of deionised water. The solution so obtained is titrated against a previously standardised solution of KOH in ethanol. An appropriate indicator, such as for example a glass electrode for acid-base titrations in non-aqueous solvents, is used to determine the end point of the titration. The terminal acid groups content is calculated on the basis of the consumption of the KOH solution in ethanol according to the following equation:

$$\text{Terminal acid groups content (meq KOH/kg polymer)} = \frac{\lfloor (V_{eq} - V_b) \cdot T \rfloor \cdot 1000}{P}$$

in which: $V_{eq}$=ml of KOH solution in ethanol at the end point for the titration of the sample;
$V_b$=ml of KOH solution in ethanol required to reach a pH=9.5 during the blank titration;
T=concentration of the KOH solution in ethanol expressed as mols/litre;
P=weight of the sample in grams.

When used for applications typical of plastics materials (such as for example bubble film forming, injection moulding, expanded products, etc.), the Melt Flow Rate (MFR) for the polyesters obtained by the process according to this invention preferably lies between 500 and 1 g/10 min, more preferably between 100 and 2 g/10 min, even more preferably between 70 and 3 g/10 min (measurement made at 190° C./2.16 kg according to ASTM standard D1238-89 "Standard Test Method for Melt Flow Rates of Thermoplastics by Extrusion Plastometer"). Preferably the polyesters obtained by the process according to this invention have an intrinsic viscosity (measured using an Ubbelohde viscosity meter for solutions in $CHCl_3$ having a concentration of 0.2 g/dl at 25° C.) of more than 0.4, preferably between 0.4 and 2, more preferably between 0.7 and 1.5 dl/g.

Preferably the polyesters obtained by the process according to this invention are biodegradable. In the meaning of this invention, by biodegradable polymers are meant biodegradable polymers having a relative biodegradability after 180 days of 90% or more with respect to microcrystalline cellulose in accordance with standard ISO 14855-1 (2013).

The polyesters obtained by the process according to this invention may be used in a mixture, which may also be obtained by reactive extrusion processes, with one or more polymers of synthetic or natural origin, which may or may not be biodegradable.

In particular the polyesters obtained by the process according to this invention may be used as a mixture with biodegradable polyesters of the diacid-diol, hydroxyacid or polyester-ether type.

As far as the said biodegradable polyesters of the diacid-diol type are concerned, these may be either aliphatic or aliphatic-aromatic.

The biodegradable aliphatic diacid-diol polyesters comprise aliphatic diacids and aliphatic diols, while the biodegradable aliphatic-aromatic polyesters have an aromatic part mainly comprising aromatic acids having multiple functional groups, the aliphatic part comprising aliphatic diacids and aliphatic diols.

The biodegradable aliphatic-aromatic diacid-diol polyesters are preferably characterised by a content of aromatic acids having multiple functional groups of between 30 and 90% mol, preferably between 45 and 70% mol with respect to the total moles of the acid component. Preferably the aromatic acids having multiple functional groups are selected from aromatic dicarboxylic compounds of the phthalic acid type and their esters, preferably terephthalic acid, and aromatic heterocyclic dicarboxylic acids and their esters, preferably 2,5-furandicarboxylic acid. In a particularly preferred embodiment these aromatic heterocyclic dicarboxylic compounds are obtained from raw materials of renewable origin, thus helping to reduce the utilisation of non-renewable resources such as, for example raw materials of fossil origin.

Aliphatic-aromatic polyesters in which the aromatic acids having multiple functional groups comprise mixtures of aromatic dicarboxylic compounds of the phthalic acid type and aromatic heterocyclic dicarboxylic compounds in which the aromatic heterocyclic dicarboxylic compounds preferably comprise 1-99%, preferably 5-95%, more preferably 20-90% mol with respect to the total moles of aromatic acids having multiple functional groups are particularly preferred.

The aliphatic diacids of biodegradable aliphatic and aliphatic-aromatic polyesters comprise saturated dicarboxylic acids, such as oxalic acid, malonic acid, succinic acid, glutaric acid, adipic acid, pimelic acid, suberic acid, azelaic acid, sebacic acid, undecanoic acid, dodecanoic acid and brassylic acid, their esters and their mixtures. Of these, adipic acid and dicarboxylic acids from a renewal source are preferred, and among the latter dicarboxylic acids from renewable sources such as succinic acid, sebacic acid, azelaic acid, undecanedioic acid, dodecanedioic acid and brassylic acid and their mixtures are particularly preferred.

Examples of aliphatic diols in the biodegradable aliphatic and aliphatic-aromatic polyesters from diacid-diols are: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentyl glycol, 2-methyl-1,3- propanediol, dianhydrosorbitol, dianhydromannitol, dianhydroiditol, cyclohexanediol, cyclohexanemethanediol and their mixtures. Of these, 1,4-butanediol, 1,3-propanediol and 1,2 ethanediol and their mixtures are particularly preferred.

Preferably the mixtures of polyesters obtained by the process according to this invention with the biodegradable aliphatic and aliphatic-aromatic polyesters from diacid-diols described above are characterised by a biodegradable polyester content which varies within the range between 1 and 99% by weight, more preferably between 5 and 95% by weight with respect to the sum of the weights of the polyesters obtained by the process according to this invention and the latter respectively.

It is also possible to mix the polyesters according to the invention with more than one biodegradable polyester of the diacid-diol type. Both binary and ternary mixtures of polyesters obtained by the process according to this invention with the said biodegradable diacid-diol polyesters are particularly preferred.

Of these biodegradable hydroxyacid polyesters, those preferred are: poly-L-lactic acid, poly-D-lactic and stereocomplex poly-D-L-lactic acid, poly-ε-caprolactone, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate.

Preferably the mixtures of polyesters obtained by the process according to this invention, with the biodegradable hydroxyacid polyesters described above are characterised by a content of the said biodegradable polyesters which varies within the range from 1 to 99% by weight, preferably from 5 to 95% by weight with respect to the sum of the weights of the polyesters obtained by the process according to this invention and the latter respectively.

The polyesters obtained by the process according to this invention may also be used as a mixture with polymers of natural origin such as, for example starch, cellulose, chitin, chitosan, alginates, proteins such as gluten, zein, casein, collagen, gelatin, natural gums, rosinic acid and its derivatives, lignins as such, or purified, hydrolysed, basified, etc., lignins or their derivatives. Starches and cellulose may be modified, and among these mention may be made of for example starch or cellulose esters having a degree of substitution of between 0.2 and 2.5, hydroxypropylate starches, starches modified with fatty chains, and cellophane. Mixtures with starch are particularly preferred. The starch may be used in either destructured or gelatinised form or as a filler. The starch may represent the continuous or the disperse phase, or may be in a co-continuous form. In the case of dispersed starch, the starch is preferably in a form smaller than a micron in average diameter, and more preferably smaller than 0.5 μm.

Preferably the polyester mixtures obtained by the process according to this invention together with the polymers of natural origin described above are characterised by a content of the said polymers of natural origin which varies within the range from 1 to 99% by weight, more preferably between 5 and 95% by weight, and more preferably 10 and 40% by weight with respect to the sum of the weights of the polyesters obtained by the process according to this invention and the latter respectively.

The polyesters obtained by the process according to this invention may also be used as a mixture with polyolefins, aromatic polyesters, polyester- and polyether-urethanes, polyurethanes, polyamides, polyaminoacids, polyethers, polyureas, polycarbonates and mixtures thereof.

Among the polyolefins, those preferred are: polyethylene, polypropylene, their copolymers, polyvinyl alcohol, polyvinyl acetate, poly ethyl vinyl acetate and polyethylene vinyl alcohol. Of the aromatic polyesters, those preferred are: PET, PBT, PTT in particular having a renewable content of >30% and polyalkylenefurandicarboxylates. Of the latter, those preferred are: poly(1,2-ethylene-2,5-furandicarboxylate), poly(1,3-propylene-2,5-furandicarboxylate), poly(1,4-butylene-2,5-furandicarboxylate) and their mixtures. Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11, 6/12 type.

The polycarbonates may be polyethylene carbonates, polypropylene carbonates, polybutylene carbonates, their mixtures and copolymers.

The polyethers may be polyethylene glycols, polypropylene glycols, polybutylene glycols, their copolymers and their mixtures having molecular weights from 70000 to 500000.

Preferably the polyester mixtures obtained by the process according to this invention using the polymers described above (polyolefins, aromatic polyesters, polyester- and polyether-urethanes, polyurethanes, polyamides, polyaminoacids, polyethers, polyureas, polycarbonates and mixtures thereof) are characterised by a content of the said polymers which varies within the range between 0.5 and 99% by weight, more preferably between 5 and 50% by weight with respect to the sum of the weights of the polyesters obtained by the process according to this invention and the latter respectively.

The polyesters obtained by the process according to this invention are extremely suitable for use alone or as a mixture in other polymers, in many practical applications for the manufacture of products such as, for example films, fibres, non-woven fabrics, sheets, moulded, thermoformed, blown, expanded and laminated articles, including those manufactured by the technique of extrusion coating.

Examples of products comprising the polyesters obtained by the process according to this invention are:
  films, with mono and bi-orientated films, and multi-layer films with other polymer materials;
  film for use in the agricultural sector as mulching films;
  stretch films including thin film for foodstuffs, for bales in agriculture and for the wrapping of wastes;
  bags and linings for the collection of organic materials such as the collection of food wastes and grass cuttings;
  thermoformed food packages, both single-layer and multi-layer, such as for example containers for milk, yogurt, meat, beverages, etc.;
  coatings obtained by the technique of extrusion coating;
  multi-layer laminates with layers of cardboard, plastics materials, aluminium, metallised films;
  expanded or expandable beads for the production of parts formed by sintering;
  expanded and semi-expanded products including expanded blocks formed by pre-expanded particles;
  expanded sheets, thermoformed expanded sheets, containers from these obtained for food packaging;
  containers in general for fruit and vegetables;
  compositions with gelatinised, destructured and/or complex starch, natural starch, flours, other fillers of natural, plant or inorganic origin as filler;
  fibres, microfibres, composite fibres with a core comprising rigid polymers such as PLA, PET, PTT, etc., and an outer shell of the material according to the invention, dablens composite fibres, fibres having various cross-sections from round to multi-lobed, flock fibres, fabrics and non-woven or spun-bonded or thermally bonded fabrics for the sanitary, hygiene, agriculture and clothing sectors.

They may also be used in applications as a replacement for plasticised PVC.

The process according to this invention comprises an esterification or transesterification stage and a polycondensation stage, and is characterised in that the said polycondensation stage is carried out in the presence of a catalyst comprising a mixture of at least one Titanium-based compound and at least one Zirconium-based compound in which the Ti/(Ti+Zr) weight ratio is equal to or greater than 0.01 and equal to or less than 0.7, preferably equal to or greater than 0.02 and equal to or less than 0.60.

The esterification/transesterification stage is preferably fed with a molar ratio between the aliphatic diols and the dicarboxylic acids, their esters and their salts, which is preferably between 1 and 2.5, preferably between 1.05 and 1.7.

The dicarboxylic acids, their esters or their salts, the aliphatic diols and any other co-monomers which constitute the polyester may be fed to the said stage separately, thus becoming mixed in the reactor, or may alternatively be premixed, preferably at T<70° C., before being delivered to the reactor. It is also possible to premix part of the components and subsequently modify their composition, for example in the course of the esterification/transesterification reaction.

In the case of polyesters in which the dicarboxylic component comprises repeating units deriving from several dicarboxylic acids, whether these are aliphatic or aromatic, it is also possible to premix some of these with aliphatic diols, preferably at T<70° C., adding the remaining portion of the dicarboxylic acids, diols and any other co-monomers to the esterification/transesterification reactor.

The esterification/transesterification stage of the process according to this invention is advantageously carried out at a temperature of 200-250° C. and a pressure of 0.7-1.5 bar, preferably in the presence of a esterification/transesterification catalyst.

The esterification/transesterification catalyst, which may also advantageously be used as a component of the polycondensation stage catalyst, may in turn be fed directly to the esterification/transesterification reactor or may be first also dissolved in an aliquot of one or more of the dicarboxylic acids, their esters or their salts, and the aliphatic diols, in such a way as to aid dispersion in the reaction mixture and render it more uniform. In a preferred embodiment the esterification/transesterification catalyst is selected from organometallic compounds of Tin, for example, stannoic acid derivatives, Titanium compounds, for example, titanates such as tetrabutyl orthotitanate or tetra(isopropyl) orthotitanate, Zirconium compounds, for example zirconates such as tetrabutyl orthozirconate or tetra(isopropyl) orthozirconate, compounds of Antimony, Cobalt, Lead, Aluminium, for example Al-triisopropyl and Zinc compounds and mixtures thereof.

With regard to the organometallic esterification/transesterification catalysts of the type mentioned above, during the esterification/transesterification stage of the process according to this invention they are present in concentrations preferably between 12 and 120 ppm of metal with respect to the quantity of polyester which can theoretically be obtained by converting all of the dicarboxylic acid fed to the reactor.

In a preferred embodiment the catalyst for the esterification/transesterification stage is a titanate, more preferably diisopropyl, triethanolamino titanate, preferably used in a concentration of 12-120 ppm of metal with respect to a quantity of polyester which can theoretically be obtained by converting all of the dicarboxylic acid fed to the reactor. Preferably the reaction time for the esterification/transesterification stage in the process according to this invention is between 4 and 8 hours. At the end of the esterification/transesterification stage an oligomer product having Mn <5000, an intrinsic viscosity of 0.05-0.15 dl/g, and an acidity <80 meq/kg is obtained.

In a preferred embodiment of the process according to this invention the catalyst is fed to the polycondensation stage together with the oligomer product at the end of the esterification/transesterification stage.

The polycondensation stage in the process according to this invention is carried out in the presence of a catalyst comprising a mixture of at least one Titanium-based compound and at least one Zirconium-based compound in which the Ti/(Ti+Zr) ratio by weight is equal to or greater than 0.01 and equal to or less than 0.70, preferably equal to or greater than 0.02 and equal to or less than 0.60.

In a preferred embodiment the polycondensation catalyst based on Titanium is a titanate advantageously selected from compounds having the general formula $Ti(OR)_4$ in which R is a ligand group comprising one or more atoms of Carbon, Oxygen, Phosphorus, Silicon and/or Hydrogen. Different ligand groups R may be present on the same Titanium atom, but preferably they are identical so as to assist preparation of the titanate. Also, 2 or more ligands R may be derived from a single compound and may be chemically bound together in addition to being bound by the Titanium (so-called multidentate ligands such as for example triethanolamine, citric acid, glycolic acid, malic acid, succinic acid, ethanediamine). R is advantageously selected from H, triethanolamine, citric acid, glycolic acid, malic acid, succinic acid, 3-oxobutanoic acid, ethanediamine and branched $C_1$-$C_{12}$ alkyl residues such as for example ethyl, propyl, n-butyl, pentyl, isopropyl, isobutyl, isopentyl, hexyl and ethylhexyl. In a preferred embodiment R is selected from $C_1$-$C_{12}$ alkyl residues, preferably $C_1$-$C_8$, more preferably n-butyl.

The preparation of titanates is known in the literature. Typically these are prepared by causing Titanium tetrachloride and the precursor alcohol of formula ROH to react in the presence of a base such as for example ammonia, or through the transesterification of other titanates. Commercial examples of titanates which it is possible to use in the process according to this invention include the products Tyzor ® TPT (tetra isopropyl Titanate), Tyzor ® TnBT (tetra n-butyl Titanate) and Tyzor ® TE (diisopropyl triethanolamino Titanate).

In a preferred embodiment the polycondensation catalyst based on Zirconium is a zirconate advantageously selected from compounds having the general formula $Zr(OR)_4$ in which R is a ligand group comprising one or more atoms of Carbon, Oxygen, Phosphorus, Silicon and/or Hydrogen. As in the case of titanates, several different ligand groups R may be present on the same Zirconium atom, but preferably these are identical so as to assist preparation of the zirconate. In addition to this, 2 or more ligands R may be derived from a single compound or may be chemically bound together in addition to being bound by the Zirconium (so-called multidentate ligands such as for example triethanolamine, citric acid, glycolic acid, malic acid, succinic acid, ethanediamine). R is advantageously selected from H, triethanolamine, citric acid, glycolic acid, malic acid, succinic acid, 3-oxobutanoic acid, ethanediamine and straight or branched $C_1$-$C_{12}$ alkyl residues such as for example ethyl, propyl, n-butyl, pentyl, isopropyl, isobutyl, isopentyl, hexyl or ethylhexyl. In a preferred embodiment, R is selected from $C_1$-$C_{12}$ alkyl residues, preferably $C_1$-$C_8$, more preferably n-butyl.

The preparation of zirconates is known in the literature, and is similar to that described above for titanates. Commercial examples of zirconates which can be used in the process according to this invention include the products Tyzor ® NBZ (tetra n-butyl Zirconate), Tyzor NPZ (tetra n-propyl Zirconate), IG-NBZ (tetra n-butyl Zirconate)

Preferably the catalyst in the polycondensation stage of the process according to this invention comprises a mixture of at least one titanate and at least one zirconate, more preferably a mixture of tetra n-butyl Titanate and tetra n-butyl Zirconate.

In addition to Titanium and Zirconium compounds, the polycondensation catalyst may also comprise phosphorus compounds, for example phosphonic and phosphinic acids, organic phosphates and phosphites, Silicates, organic and inorganic salts of alkali metals and alkaline earth metals.

The polycondensation catalyst may be fed to the polycondensation stage either by separately feeding its various components to the reactor, or premixing them and feeding them to the reactor as a mixture. It is also possible to premix some of the components and adjust the catalyst composition subsequently, for example at the time when it is placed in contact with the oligomer product.

When a catalyst containing Titanium and/or Zirconium compounds is used in the esterification/transesterification stage of the process according to this invention, in a preferred embodiment of the process according to this invention this catalyst is not separated from the oligomer product and is fed together with it to the polycondensation stage and advantageously used as a polycondensation catalyst or as a component thereof, with possible adjustment of the molar ratio between Titanium and Zirconium by adding suitable quantities of Titanium and Zirconium compounds to the said polycondensation stage. In a particularly preferred embodiment the catalyst for the polycondensation stage is the same as that for the esterification/transesterification stage.

The polycondensation stage is advantageously carried out by feeding the oligomer product to the polycondensation reactor and causing the whole to react in the presence of the catalyst at a temperature of 220-250° C. and at a pressure of <5mbar.

Preferably the polycondensation stage of the process according to this invention is carried out in the presence of a total quantity of Titanium and Zirconium of 80-500 ppm, with respect to the quantity of polyester which could theoretically be obtained by converting all of the dicarboxylic acid fed to the reactor in the catalyst.

Preferably the reaction time for the polycondensation stage in the process according to this invention is between 4 and 8 hours. At the end of the polycondensation stage a polyester having Mn>50000, an intrinsic viscosity of 0.9-1.05 dl/g, and an acidity<50 meq/kg is obtained.

Dependent upon the specific molecular weight properties and the desired viscosity for the polyester, the process according to this invention may provide for one or more stages of chain extension, reactive processing or reactive extrusion, including with other polymers through the use of peroxides, divinyl ethers, bisoxazoline, polyepoxides, di- and poly-isocyanates, carbodiimides or dianhydrides after the polycondensation stage.

The invention will now be illustrated through a number of embodiments which are intended to be by way of example and not limiting the scope of protection of this patent application.

EXAMPLES

Example 1 (Comparative)

Preparation of a poly (1,4-butylene sebacate-co-1,4-butylene terephthalate) (PBST) with 48% mol of 1,4-butylene terephthalate Units Using a Polycondensation Catalyst Comprising Only Titanate Esterification Stage 6677 g of terephthalic acid, 8802 g of sebacic acid, 11313 g of 1,4-butanediol, 11.6 g of glycerine and 3.4 g of an 80% by weight ethanolic solution of diisopropyl triethanolamino Titanate (Tyzor TE, containing 8.2% by weight of Titanium) were added in a diol/dicarboxylic acid molar ratio (MGR) of 1.50 to a steel reactor having a geometrical capacity of 24 litres, fitted with a mechanical stirrer system, an inlet for nitrogen, a distillation column, a knock-down system for high-volume distillates and a connection to a high vacuum system.

The temperature of the mass was gradually increased to 230° C. over a period of 120 minutes.

Polycondensation Stage

When 95% of the theoretical water had been distilled off, 17.2 g (corresponding to 120 ppm of metal with respect to the quantity of PBST which could theoretically be obtained by converting all the sebacic acid and all the terephthalic acid fed to the reactor) of tetra n-butyl Titanate was added, thus obtaining a Ti/(Zr+Ti) ratio by weight of 1, bearing in mind the Titanium introduced with the esterification catalyst. The temperature of the reactor was then raised to 235-240° C. and the pressure was gradually reduced until a value of less than 2 mbar was reached over a period of 60 minutes. The reaction was allowed to proceed for approximately 4:30 hours, the time required to obtain a PBST with an MFR of approximately 3-4 (g/10 minutes at 190° C. and 2.18 kg), and the material was then discharged into a water bath in the form of a string and granulated.

Example 2 (Comparative)

Preparation of a PBST with 48% mol of 1,4-butylene terephthalate Units Using a Polycondensation Catalyst Comprising a Titanate and Zirconate Mixture with a Ti/(Zr+Ti) Ratio by Weight=0.75

Example 1 was repeated adding 18.12 g (corresponding to 139 ppm of metal with respect to the quantity of PBST which could theoretically be obtained by converting all the sebacic acid and all the terephthalic acid fed to the reactor) of a mixture of 14.42 g of tetra n-butyl Titanate and 3.7 g of tetra n-butyl Zirconate to the polycondensation stage instead of 17.2 g of tetra n-butyl Titanate, thus obtaining a Ti/(Zr+

Ti) ratio by weight of 0.75, bearing in mind the Titanium introduced with the esterification catalyst.

Example 3

Preparation of a PBST with 48% mol of 1,4-butylene terephthalate Units Using a Polycondensation Catalyst Comprising a Titanate and Zirconate Mixture with a Ti/(Zr+Ti) Ratio by Weight=0.60

Example 1 was repeated adding 18.74 g (corresponding to 153 ppm of metal with respect to the quantity of PBST which could theoretically be obtained by converting all the sebacic acid and all the terephthalic acid fed to the reactor) of a mixture of 12.28 g of tetra n-butyl Titanate and 6.46 g of tetra n-butyl Zirconate to the polycondensation stage instead of 17.2 g of tetra n-butyl Titanate, thus obtaining a Ti/(Zr+Ti) ratio by weight of 0.604, bearing in mind the Titanium introduced with the esterification catalyst.

Example 4

Preparation of a PBST with 48% mol of 1,4-butylene terephthalate Units Using a Polycondensation Catalyst Comprising a Titanate and Zirconate mixture with a Ti/(Zr+Ti) Ratio by Weight=0.24

Example 1 was repeated adding 20.8 g (corresponding to 198 ppm of metal with respect to the quantity of PBST which could theoretically be obtained by converting all the sebacic acid and all the terephthalic acid fed to the reactor) of a mixture of 5.2 g of tetra n-butyl Titanate and 15.6 g of tetra n-butyl Zirconate to the polycondensation stage instead of 17.2 g of tetra n-butyl Titanate, thus obtaining a Ti/(Zr+Ti) ratio by weight of 0.24, bearing in mind the Titanium introduced with the esterification catalyst.

Example 5

Preparation of a PBST with 48% mol of 1,4-butylene terephthalate Units Using a Polycondensation Catalyst Comprising a Titanate and Zirconate Mixture with a Ti/(Zr+Ti) Ratio by Weight=0.10

Example 1 was repeated adding 21.92 g (corresponding to 222 ppm of metal with respect to the quantity of PBST which could theoretically be obtained by converting all the sebacic acid and all the terephthalic acid fed to the reactor) of a mixture of 1.34 g of tetra n-butyl Titanate and 20.58 g of tetra n-butyl Zirconate to the polycondensation stage instead of 17.2 g of tetra n-butyl Titanate, thus obtaining a Ti/(Zr+Ti) ratio by weight of 0.10, bearing in mind the Titanium introduced with the esterification catalyst.

Example 6 (Comparative)

Preparation of a PBST with 48% mol of 1,4-butylene terephthalate Units Using a Polycondensation Catalyst Comprising only a Zirconate

Example 1 was repeated by adding in the esterification/transesterification stage, instead of 3.4 g of an 80% by weight ethanolic solution of diisopropyl triethanolamino Titanate, 5.94 g of Ammonium Zirconium Lactate and adding 22.10g (corresponding to 229 ppm of metal with respect to the quantity of poly-1,4-butylene succinate which could theoretically be obtained by converting all of the succinic acid fed to the reactor) of g of tetra n-butyl Zirconate in the polycondensation stage, instead of 17.2 g of tetra n-butyl Titanate, thus obtaining a Ti/(Zr+Ti) ratio by weight of 0.

Example 7 (Comparative)

Preparation of a PBST with 85% mol of 1,4-butylene terephthalate Units Using a Polycondensation Catalyst Comprising only a Titanate and Zirconate mixture with a Ti/(Zr+Ti) Ratio by Weight=0.75

Example 2 was repeated for preparing a PBST with 85% mol of 1,4-butylene terephthalate units, instead of a PBTS with 48 mol % of 1,4-butylene terephthalate units. Thus, 12520 g of terephthalic acid, 2690 g of sebacic acid, 11980 g of 1,4-butanediol, 12.2 g of glycerine were added to the esterification/transesterification stage,

Example 8 (Comparative)

Preparation of a PBST with 85 mol % of Aromatic Units using a Polycondensation Catalyst Comprising only a Titanate and Zirconate Mixture with a Ti/(Zr+Ti) Ratio by Weight=0.24.

Example 4 was repeated for preparing a PBST with 85% mol of 1,4-butylene terephthalate units, instead of a PBTS with 48 mol % of 1,4-butylene terephthalate units. Thus, 12520 g of terephthalic acid, 2690 g of sebacic acid, 11980 g of 1,4-butanediol, 12.2 g of glycerine were added to the esterification/transesterification stage,

Example 9

Preparation of a poly (1,4-butylene adipate-co-1,4-butylene terephthalate) (PBAdT) with 47% mol of 1,4-butylene terephthalate Units Using a Polycondensation Catalyst Comprising a Titanate and Zirconate Mixture with a Ti/(Zr+Ti) Ratio by Weight=0.60

Example 3 was repeated for preparing a PBAdT with 47% mol of 1,4-butylene terephthalate units, instead of a PBTS with 48 mol % of 1,4-butylene terephthalate units. Thus, 7450 g of terephthalic acid, 7390 g of adipic acid, 12890 g of 1,4-butanediol, 13.2 g of glycerine were added to the esterification/transesterification stage.

Example 10

Preparation of a PBAdT with 47% mol of 1,4-butylene terephthalate Units Using a Polycondensation Catalyst Comprising a Titanate and Zirconate Mixture with a Ti/(Zr+Ti) Ratio by Weight=0.24

Example 4 was repeated for preparing a PBAdT with 47% mol of 1,4-butylene terephthalate units, instead of a PBTS with 48 mol % of 1,4-butylene terephthalate units. Thus, 7450. g of terephthalic acid, 7390 g of adipic acid, 12890 g of 1,4-butanediol, 13.2 g of glycerine were added to the esterification/transesterification stage.

Example 11

Preparation of a PBAdT with 47% mol of 1,4-butylene terephthalate Units Using a Polycondensation Catalyst Comprising a Titanate and Zirconate Mixture with a Ti/(Zr+Ti) Ratio by Weight=0.10

Example 5 was repeated for preparing a PBAdT with 47% mol of 1,4-butylene terephthalate units, instead of a PBTS with 48 mol % of 1,4-butylene terephthalate units. Thus, 7450 g of terephthalic acid, 7390 g of adipic acid, 12890 g of 1,4-butanediol, 13.2 g of glycerine were added to the esterification/transesterification stage.

Example 12 (Comparative)

Preparation of a PBAdT with 47% mol of 1,4-butylene terephthalate Units Using a Polycondensation Catalyst Comprising only a Zirconate Example 6 was repeated for preparing a PBAdT with 47% mol of 1,4-butylene terephthalate units, instead of a PBTS with 48 mol % of 1,4-butylene terephthalate units. Thus, 7450 g of terephthalic acid, 7390 g of adipic acid, 12890 g of 1,4-butanediol, 13.2 g of glycerine were added to the esterification/transesterification stage.

Example 13

Preparation of a poly (1,4-butylene azelate-co-1,4-butylene terephthalate) (PBAzT) with 48% mol of 1,4-butylene terephthalate Units Using a Polycondensation Catalyst Comprising a Titanate and Zirconate Mixture with a Ti/(Zr+Ti) Ratio by Weight=0.60

Example 3 was repeated for preparing a PBAzT with 48% mol of 1,4-butylene terephthalate units, instead of a PBTS with 48 mol % of 1,4-butylene terephthalate units. Thus, 6910 g of terephthalic acid, 8480 g of adipic acid, 11700 g of 1,4-butanediol, 12.0 g of glycerine were added to the esterification/transesterification stage.

Example 14

Preparation of a PBAzT with 48% mol of 1,4-butylene terephthalate Units Using a Polycondensation Catalyst Comprising a Titanate and Zirconate Mixture with a Ti/(Zr+Ti) Ratio by Weight=0.24

Example 4 was repeated for preparing a PBAzT with 48% mol of 1,4-butylene terephthalate units, instead of a PBTS with 48 mol % of 1,4-butylene terephthalate units. Thus, 6910 g of terephthalic acid, 8480 g of adipic acid, 11700 g of 1,4-butanediol, 12.0 g of glycerine were added to the esterification/transesterification stage.

Example 15

Preparation of a PBAzT with 48% mol of 1,4-butylene terephthalate Units Using a Polycondensation Catalyst Comprising a Titanate and Zirconate Mixture with a Ti/(Zr+Ti) Ratio by Weight=0.10

Example 5 was repeated for preparing a PBAzT with 48% mol of 1,4-butylene terephthalate units, instead of a PBTS with 48 mol % of 1,4-butylene terephthalate units. Thus, 6910. g of terephthalic acid, 8480 g of adipic acid, 11700 g of 1,4-butanediol, 12.0 g of glycerine were added to the esterification/transesterification stage.

Example 16 (Comparative)

Preparation of a PBAzT with 48% mol of 1,4-butylene terephthalate Units Using a Polycondensation Catalyst Comprising only a Zirconate Example 6 was repeated for preparing a PBAzT with 48% mol of 1,4-butylene terephthalate units, instead of a PBTS with 48 mol % of 1,4-butylene terephthalate units. Thus, 6910. g of terephthalic acid, 8480 g of adipic acid, 11700 g of 1,4-butanediol, 12.0 g of glycerine were added to the esterification/transesterification stage.

Samples of the polyesters according to examples 1-16 were obtained at the end of the stage of discharging the reactor to determine their MFR, oligomer content and terminal acid groups content (CEG) in accordance with the methods described in this application (Table 1).

TABLE 1

Examples 1-16

| Example | Polyester | mol % of 1,4-butylene terephthalate units | MGR | Ti/ (Ti + Zr) (weight/ weight) | Moles of Metal/ ton of polyester | Reaction time (hrs:mins) | Oligomers (%) | MFR (g/10 min 190° C. and 2.16 kg) | CEG (meq/ kg) |
|---|---|---|---|---|---|---|---|---|---|
| 1 (comparative) | PBST | 48 | 1.50 | 1 | 2.81 | 4:30 | 5.0 | 3.3 | 36 |
| 2 (comparative) | PBST | 48 | 1.50 | 0.75 | 2.83 | 4:30 | 5.0 | 5.2 | 38 |
| 3 | PBST | 48 | 1.50 | 0.60 | 2.83 | 3:20 | 2.2 | 3.7 | 34 |
| 4 | PBST | 48 | 1.50 | 0.24 | 2.82 | 5:00 | 3.5 | 4.4 | 32 |
| 5 | PBST | 48 | 1.50 | 0.10 | 2.83 | 6:30 | 2.1 | 3.5 | 28 |
| 6 (comparative) | PBST | 48 | 1.50 | 0 | 2.83 | 7:45 | 1.4 | >40 | nd |
| 7 (comparative) | PBST | 85 | 1.50 | 0.75 | 2.83 | 3:00 | 0.7 | 16.6 (220° C./ 2.16 Kg) | 27 |
| 8 (comparative) | PBST | 85 | 1.50 | 0.24 | 2.83 | 2:45 | 0.5 | 17.4 (220° C./ 2.16 Kg) | 24 |

TABLE 1-continued

Examples 1-16

| Example | Polyester | mol % of 1,4-butylene terephthalate units | MGR | Ti/(Ti + Zr) (weight/weight) | Moles of Metal/ton of polyester | Reaction time (hrs:mins) | Oligomers (%) | MFR (g/10 min 190° C. and 2.16 kg) | CEG (meq/kg) |
|---|---|---|---|---|---|---|---|---|---|
| 9 | PBAdT | 47 | 1.50 | 0.60 | 2.47 | 6:00 | 1.7 | 10 | 16 |
| 10 | PBAdT | 47 | 1.50 | 0.24 | 2.47 | 4:00 | 1.2 | 11 | 17 |
| 11 | PBAdT | 47 | 1.50 | 0.10 | 2.47 | 5:50 | 1.0 | 11.9 | 15 |
| 12 (comparative) | PBAdT | 47 | 1.50 | 0 | 2.47 | 8:00 | 1.0 | >40 | nd |
| 13 | PBAzT | 48 | 1.50 | 0.60 | 2.83 | 4:00 | 1.9 | 3.6 | 43 |
| 14 | PBAzT | 48 | 1.50 | 0.24 | 2.83 | 4:00 | 2.6 | 5.6 | 32 |
| 15 | PBAzT | 48 | 1.50 | 0.10 | 2.83 | 7:50 | 1.3 | 7.5 | 35 |
| 16 (comparative) | PBAzT | 48 | 1.50 | 0 | 2.83 | 10:00 | 1.0 | >40 | nd |

The invention claimed is:

1. A process for the production of polyesters comprising:
   a) a dicarboxylic component comprising:
      a1) 40-60% mol of units deriving from at least one aromatic dicarboxylic acid,
      a2) 60-40% mol of units deriving from at least one aliphatic dicarboxylic acid,
   b) a diol component comprising units deriving from at least one aliphatic diol;
   said process comprising an esterification step and a following polycondensation step, wherein: said esterification step is performed in the presence of an esterification catalyst selected from Titanium compounds, and said polycondensation step is performed in the presence of a catalyst comprising a mixture of at least one Titanium-based compound and at least one Zirconium-based compound in which the weight ratio Ti/(Ti+Zr) is equal to or higher than 0.01 and equal to or lower than 0.70.

2. The process according to claim 1, in which said aliphatic diol is selected from the group consisting of 1,2-ethanediol, 1,2-propanediol, 1,3-propanediol, 1,4-butanediol, 1,5-pentanediol, 1,6-hexanediol, 1,7-hheptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, cyclohexanemethanediol, pentaerythritol, glycerol, polyglycerol, trimethylolpropane, polyalkylene glycols with molecular weight of 100-4000 and mixtures thereof.

3. The process according to claim 1, in which said aromatic dicarboxylic acid is selected from the group consisting of terephthalic acid, isophthalic acid, 2,5-furandicarboxylic acid, their esters, their salts and mixtures thereof.

4. The process according to claim 1, in which said aliphatic dicarboxylic acid is selected from the group consisting of saturated dicarboxylic acids $C_2$-$C_{24}$, their alkylic esters $C_1$-$C_{24}$, their salts and mixtures thereof.

5. The process according to claim 1, in which said esterification step the molar ratio between the, aliphatic diols and the dicarboxylic acids, their ester and their salts is between 1 and 2.5.

6. The process according to claim 1, in which the esterification step is performed at a temperature of 200-250° C. and at a pressure of 0.7-1.5 bar.

7. The process according to claim 1, in which the esterification step is performed in the presence of an organometallic catalyst selected from the group consisting of the organometallic compounds of Tin, Titanium, Zirconium, Antimony, Cobalt, Lead, Aluminium, Zinc and mixtures thereof.

8. The process according to claim 7, in which said organometallic catalyst is present, in the esterification step, in a concentration of 12-120 ppm of metal with respect to the amount of polyester theoretically obtained by conversion of all the dicarboxylic acid fed to the process.

9. The process according to claim 1, in which said Titanium-based compound of the polycondensation step is a Titanate having general formula $Ti(OR)_4$ in which R is a ligand group comprising one or more atoms of Carbon, Oxygen Phosphorus, Silica, and/or Hydrogen.

10. The process according to claim 9, in which said R is selected from the group consisting of H, triethanolamine, citric acid, glycolic acid, malic acid, succinic acid, ethanediamine, linear and branched alkyl residues $C_1$-$C_{12}$.

11. The process according to claim 10, in which said R is selected from linear or branched alkyl residues $C_1$-$C_{12}$.

12. The process according to claim 11, in which said R is n-butyl.

13. The process according to claim 1, in which said Zirconium-based compound of the polycondensation phase is a Zirconate having general formula $Zr(OR)_4$ in which R is a ligand group comprising one or more atoms of Carbon, Oxygen Phosphorus, Silica, and/or Hydrogen.

14. The process according to claim 13, in which said R is selected from the group consisting of H, triethanolamine, citric acid, glycolic acid, malic acid, succinic acid, ethanediamine, linear and branched alkyl residues $C_1$-$C_{12}$.

15. The process according to claim 14, in which said R is selected from linear or branched alkyl residues $C_1$-$C_{12}$.

16. The process according to claim 15, in which said R is n-butyl.

17. The process according to claim 1, in which said polycondensation catalyst comprises a mixture of tetra n-butyl Titanate and tetra n-butyl Zirconate.

18. The process according to claim 1, in which said polycondensation step is performed at a temperature of 220-250° C. and at a pressure<5 mbar.

19. The process according to claim 1, in which said polycondensation step is performed in the presence of a total amount of Titanium and Zirconium-based catalyst of 80-500 ppm of metal, with respect to the amount of polyester theoretically obtainable by conversion of all the dicarboxylic acid fed to the process.

20. The process according to claim 1, comprising, after the polycondensation step, one or more steps of chain extension, reactive processing and/or of reactive extrusion.

21. A process for producing a polyester which comprises using as a catalyst a mixture of at least one Titanium-based compound and at least one Zirconium-based compound in which the weight ratio Ti/(Ti+Zr) is equal to or higher than 0.01 and equal to or lower than 0.70 wherein the polyester comprises:
  a) a dicarboxylic component comprising:
  a1) 40-80% mol of units deriving from at least one aromatic dicarboxylic acid,
  a2) 20-60% mol of units deriving from at least one aliphatic dicarboxylic acid,
  b) a diol component comprising units deriving from at least one aliphatic diol.

* * * * *